United States Patent [19]

Kofink et al.

[11] Patent Number: 4,739,677

[45] Date of Patent: Apr. 26, 1988

[54] ADJUSTING DEVICE, ESPECIALLY FOR LOCKING OF MOTOR VEHICLE DOORS

[75] Inventors: Wolfgang Kofink, Aichwald-Lobenrot; Werner Philipps, Ludwigsburg; Eckhardt Schmid, Brackenheim, all of Fed. Rep. of Germany

[73] Assignee: SWF Auto-Electric GmbH, Bietigheim-Bissingen, Fed. Rep. of Germany

[21] Appl. No.: 838,470

[22] Filed: Mar. 11, 1986

[30] Foreign Application Priority Data

Mar. 23, 1985 [DE] Fed. Rep. of Germany ....... 3510642

[51] Int. Cl.⁴ ....................... E05B 53/00; F16H 21/18

[52] U.S. Cl. .......................................... 74/625; 74/50; 292/201; 292/336.3

[58] Field of Search ........................... 74/50, 625, 527; 292/336.3, 201, 144, 140

[56] References Cited

U.S. PATENT DOCUMENTS

| | | | |
|---|---|---|---|
| 3,729,771 | 5/1973 | Crane et al. | 292/201 |
| 4,093,289 | 6/1978 | Inabayashi et al. | 292/336.3 |
| 4,266,816 | 5/1981 | Mukai et al. | 292/336.3 |
| 4,269,440 | 5/1981 | Gelhard | 292/336.3 |
| 4,270,783 | 6/1981 | Sorensen et al. | 292/336.3 |
| 4,272,112 | 6/1981 | Schlick et al. | 292/201 |
| 4,440,040 | 4/1984 | Kittle et al. | 74/527 |

*Primary Examiner*—David H. Corbin

*Attorney, Agent, or Firm*—James B. Raden; Robert P. Seitter

[57] ABSTRACT

An adjusting device in accordance with the invention for vehicular door locking systems operates such that in each adjusting action the adjusting force of the drive motor is checked to determine whether it is great enough to operate the output element. Only when this checking has a positive result is an adjusting action initiated.

8 Claims, 3 Drawing Sheets

Fig. 1
a.)
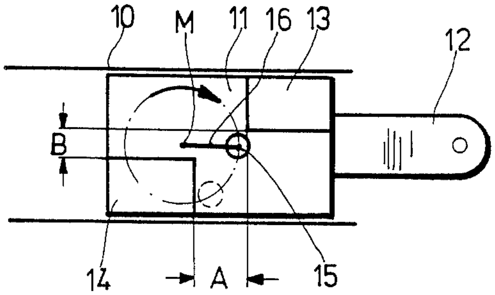
b.)
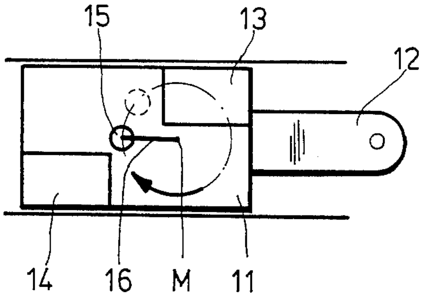
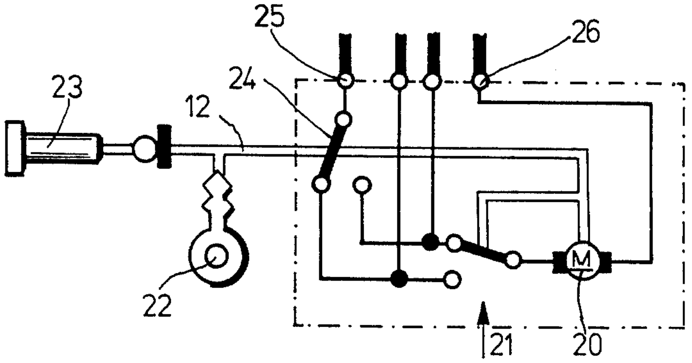
Fig. 2

ADJUSTING DEVICE, ESPECIALLY FOR LOCKING OF MOTOR VEHICLE DOORS

BACKGROUND OF THE INVENTION

The invention pertains to motor vehicle electric door locks.

An adjusting device for motor vehicle door locking systems is shown in U.S. Pat. No. 3,243,216. This adjustment device has the advantage that in the end positions the output element is completely decoupled from the drive motor, so that a smooth, manual adjustment is possible. Furthermore the relatively small amount of control apparatus for the drive motor is advantageous. The drive motor in this arrangement only rotates in one direction of rotation. However the arrangement of U.S. Pat. No. 3,243,216 does function reliably under certain conditions. If the operating voltage is high or low, it is possible for the crank to stop in a position away from its parking position in which it is not possible to adjust the slide. The slide is coupled with the push rod via an overload spring which permits the push rod to be changed over from one end position into the other end position even if the adjusting motion of the slide is blocked. However, a great amount of force is necessary to effect the changeover because the overload spring must be laid out in such a way that it can transmit the normally necessary adjusting force of the output element. However in most applications the push rod is operatively connected with the lock of the motor vehicle door and in practice the door lock can no longer be unlocked by means of the key.

SUMMARY OF THE INVENTION

An adjusting device in accordance with the invention for vehicular door locking systems operates such that in each adjusting action the adjusting force of the drive motor is checked to determine whether it is great enough to operate the output element. Only when this checking has a positive result is an adjusting action initiated.

The invention is thereby based on the finding that many cases of trouble are caused by an insufficiently stable voltage supply for the electric drive motor. If the electric motor is operated with overvoltage, the crank can run beyond the tolerance area of the parking position and is thus stopped in the motion area of the slide. On the other hand, in the case of undervoltage, the adjusting force is often too low to produce the necessary actuating power for the slide. In this case the motor is blocked and the crank is also stopped outside its normal parking position.

These two cases of trouble are effectively prevented if, according to the basic idea of the present invention, in each adjusting action the adjusting force of the drive motor is checked. The decoupling between crank and slide is interrupted only when this adjusting force is great enough. If, on the other hand, the adjusting force of the drive motor is too small the crank is to be prevented from running out of the parking position.

These basic ideas of the invention could, for example, be realized by a voltage detector, which only connects the motor to the vehicle battery when the latter supplies a sufficient voltage. However, a mechanical solution is preferred. In a mechanical solution in accordance with the invention the locking force of a locking element has to be overcome before the crank is coupled with the slide. If because of insufficient battery voltage the electric drive motor does not generate enough torque, this locking element is not overcome and the electric motor does not rotate. On the other hand it is also ensured by this locking element that the crank does not travel or coast beyond its parking position when the motor is switched off if the drive motor is operated with overvoltage, even if the adjusting mechanism operates smoothly.

In principle this locking element could act upon an additional part which is continuously operatively connected with the drive motor. However a solution is preferred, in which gearing members which are available co-operate with the locking element.

Stops could be provided on the toothed wheel connected with the crank in a manner protected against twisting, which stops then co-operate with the same stationary locking element.

Because this toothed wheel occupies different positions in the two end positions two stops would have to be provided.

In contrast thereto a solution is simpler in which the locking element co-operates with a gearing member which in the two end positions of the slide occupies the same position. Then only one stop is needed on this gearing member. The locking element of a preferred embodiment includes a locking bolt which is pressed into the path of motion of the stop by means of a compression spring. The necessary locking force of helical compression springs of this kind can be predetermined precisely.

BRIEF DESCRIPTION OF THE DRAWING

The invention will be better understood from a reading of the following detailed description in conjunction with the drawing in which:

FIG. 1*a* is a schematic view of an adjusting device in a first parking position, FIG. 1*b* is a schematic view of an adjusting device in a second parking position, FIG. 2 is a circuit diagram for controlling the electric drive motor of an adjusting device according to FIG. 1.

DETAILED DESCRIPTION

Figure 3:
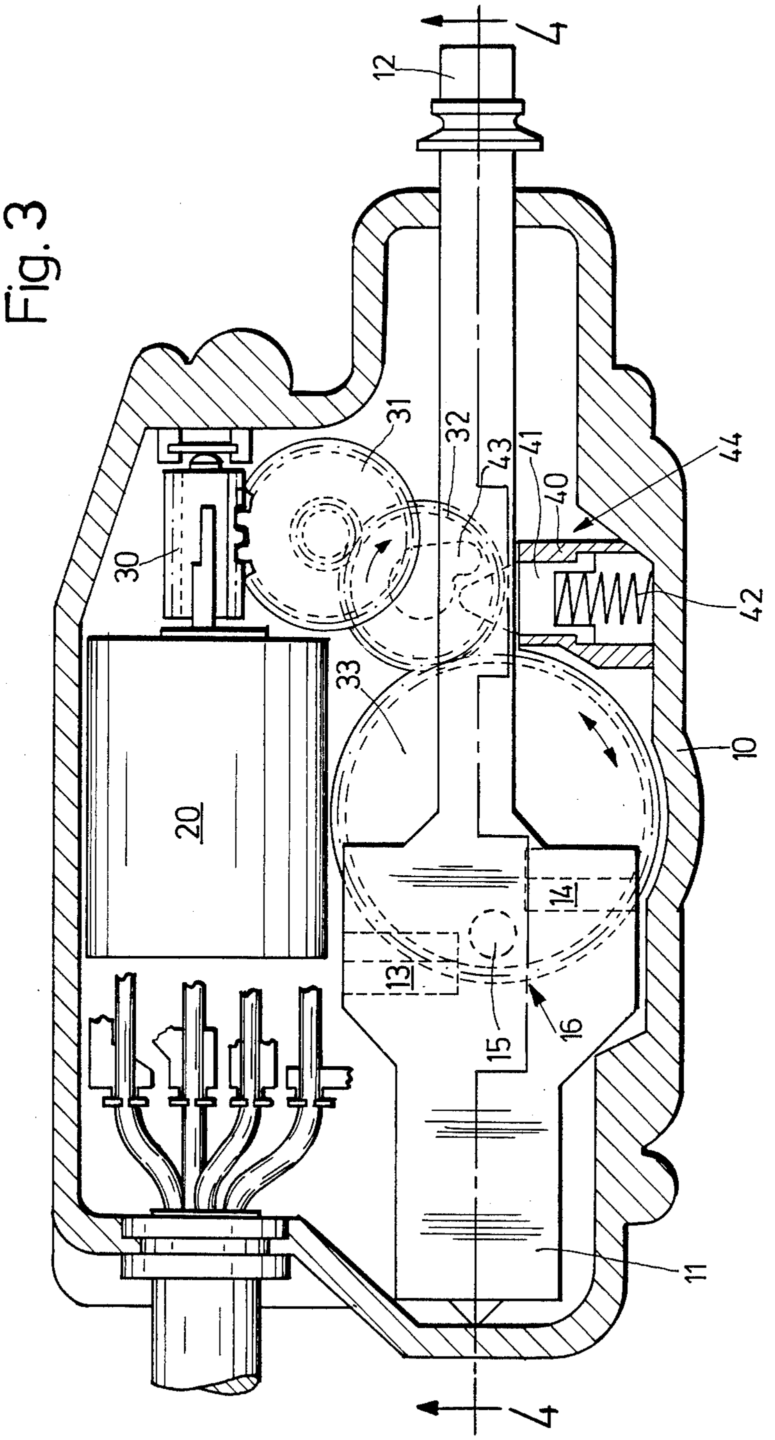
FIG. 3 is a view on an adjusting device according to the present inventions and FIG. 4 is a cross-sectional side view taken along lines 4—4 of FIG. 3.

The main functions of an adjusting device in accordance with the invention are described with respect to FIGS. 1 and 2. In a housing 10 a slide 11 is movably guided in the longitudinal direction. Slide 11 is operatively connected with a push rod 12 which, as an output element of the adjusting device, acts upon a door locking mechanism in a motor vehicle. On the slide 11 two stops 13 and 14 are provided which co-operate with pin 15 of a crank 16. One can see from FIG. 1 that the spacing A between the two stops 13 and 14 of the slide is smaller in the adjusting direction of the slide 11 than the crank radius, i.e. smaller than the spacing of pin 15 from the center of rotation M. The spacing B of the two stops 13 and 14 transversely to the adjusting direction of the slide 11 is only slightly larger than the diameter of the crank pin 15. In the parking position shown in FIG. 1*a*, the crank pin 15 is in the center between the two adjusting paths of the two stops 13 and 14. Thus in this parking position the slide 11 is completely decoupled from pin 15 and crank 16 and therefore slide 11 with the push rod 12 can be smoothly changed over from one end position into the other end position manually.

If now the electric motor driving the crank pin 15 is switched on, the crank pin is adjusted in clockwise direction on its circular adjusting path. It then hits the stop 14. During the following part of the swivelling motion of this crank pin 15 the stop 14 and thus also the slide 11 are taken along until the crank pin finally reaches the position according to FIG. 1*b*. After a swivelling angle of 180 degrees the crank pin 15 is stopped in such a way that it lies in the center between the paths of motion of the two stops 13 and 14. In this other parking position, complete decoupling between the drive motor and the slide 11 is again provided.

On the whole one can see from FIGS. 1*a* and 1*b* that in each adjusting action the crank pin 15 is driven in the same direction of rotation over a swivelling angle of 180 degrees. In an adjusting action one stop is moved out of the path of motion of the crank pin and the other stop enters the path of motion of the crank pin. The crank pin 15 is only coupled with the stops 13 or 14 during part of its swivelling motion, but in the parking positions it is decoupled from the slide 11 after a swivelling angle of 180 degrees.

FIG. 2 shows a basic circuit diagram of the adjusting device. The electric drive motor 20 is coupled with a limit switch 21, which is formed as a changeover switch. Push rod 12 acts upon a motor vehicle door lock not shown in detail which may be actuated through a key 22 or an internal locking knob 23. Moreover a two-way switch 24 is coupled with push rod 12. When internal locking knob 23 of FIG. 2 is pressed towards the right-hand side, the two-way switch 24 changes over, so that the electric motor is supplied from the voltage source with the positive pole 25 and the negative pole 26 via two-way switch 24 and limit switch 21. Crank pin 15 is changed over from one parking position into the other parking position. In this second parking position the limit switch 21 is changed over, so that the current path to the drive motor is interrupted. If the internal locking knob 23 is again moved to the left-hand side, an operating circuit for the electric motor is closed again, which operating circuit is again interrupted, as soon as the crank pin lies outside the path of motion of the two stops of the slide. If an adjusting device is operated at overvoltage it is possible for pin 15 to run beyond its normal parking position and for example to occupy the position shown with broken lines in FIG. 1*b*. In case of an operation with undervoltage it is possible that the crank pin 15 hits the stop 14, but because of a too small adjusting force is not in a position of moving the slide 11. The slide cannot be moved if the crank pin is in the position shown by broken lines in FIG. 1*a*. Thus in a case of trouble the door could no longer be unlocked.

Figure 4:
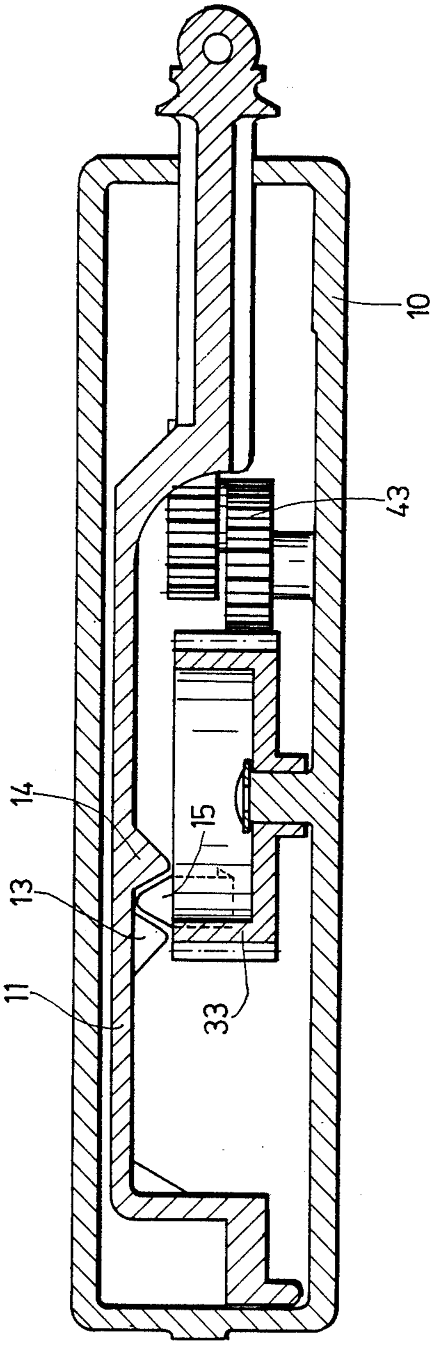

In the embodiment according to FIGS. 3 and 4, in which only principal parts to the invention are shown, the same reference numerals as in FIGS. 1 and 2 are used. In this embodiment the drive motor 20 drives a toothed wheel 33 via a worm 30 and two toothed wheels 31 and 32, onto which toothed wheel 33 the pin 15 is eccentrically fixed. Above this toothed gearing the slide 11 is guided axially displaceably. Slide 11 has the two stops 13 and 14. On the housing 10 a guide 40 for a locking pin 41 is provided. Locking pin 41 is prestressed into the position shown by the force of a compression spring 42. In this position the locking pin 41 projects into the path of motion of a stop 43 which is preferably integrally formed onto the intermediate toothed wheel 32. The locking force of this locking element 44 constructed of locking pin 41 and compression spring 42 is arranged in such a way that drive motor 20 is capable of displacing the slide 11 after having overcome the locking force of this locking element 44. Thus the force of the compression spring 42 has at least to be as high as the maximally necessary adjusting force of the slide, whereby possible effective lever lengths or force reductions have to be considered.

In the switching position shown in FIG. 3 the crank pin 15 occupies a parking position on the toothed wheel 33 which takes over the function of a crank 16. Stop 43 lies closely in front of the locking pin 41. If now the drive motor 20 is switched on, intermediate wheel 32 rotates and stop 43 must press locking pin 41 downwards against the force of the compression spring. If the drive power of the electric motor is not great enough for this purpose, the entire gearing is blocked, whereby it is ensured that the crank pin 15 does not lie in one of the paths of motion of the stops 13 or 14. Only if, after a predetermined swivelling angle of the intermediate wheel 32, the stop 43 has overcome the locking force of the locking element 44 does pin 15 enters the path of motion of the stop 14. The gear ratio between the toothed wheel 32 and the toothed wheel 33 coupled with the crank pin 15 is selected such that the intermediate wheel makes a turn of 360 degrees, when the toothed wheel 33 turns 180 degrees. Thus when an adjusting action has been carried out the stop 43 again rests against the locking element 44. Thereby the limit switch 21 is arranged such that it switches off the motor 20 when the stop 43 is about 20 degrees in front of the locking pin 41. This switch-off angle before the actual rest position of the stop 43 is selected in such a way that even with overvoltage, the torque of the motor is not sufficient to move the stop 43 beyond the locking element 44. The stop 43 is rather braked by the locking element 44, so that the result is an exactly defined parking position for the crank pin 15, too. Thus a manual adjustability of the slide 11 is ensured at any time.

In each adjusting action the adjusting force of the drive motor 20 is checked on a mechanical basis by locking element 44 and stop 43 on a part operatively connected with the motor. The necessary decoupling in the parking position between crank or crank pin 15 and slide 11 is only interrupted, when the adjusting force of the drive motor 20 exceeds a minimal value which is at least as great as the maximally necessary adjusting force for the slide. The stop is thereby arranged on a gearing member between motor and crank. Of course a solution is also conceivable in which a separate toothed wheel is driven from the worm 30, which toothed wheel has a stop. The gearing member, namely the toothed wheel 32 with the stop 43 occupies the same position in the two end positions of the slide 11. This is why only one stop 43 is necessary. A solution is also conceivable in which the stops on the toothed wheel 33 co-operate with a single locking element. However because this gearing member occupies different positions in the end positions of the slide, in this case two stops would have to be arranged diametrically opposite to each other on this toothed wheel 33.

In comparison with the prior art arrangement mentioned hereinabove, the present invention has improved operational reliability because even with high fluctuations in the supply voltage for the electric drive motor consistently accurate performance, in particular in manual adjustability is ensured. In a construction comprising the features according to the invention the slide is coupled with the push rod by a preferably two-sidedly effective overload coupling, so that no troubles occur even with a blocked lock or push rod which otherwise could for example effect that the motor 20 is no longer switched off via the limit switch 21.

The overload coupling transmitting high forces does not have to be overcome in a manual operation of the lock. Because of the exactly defined position of the crank pin, the dimensions A and B shown in FIG. 1a can be kept small, whereby a large adjusting lift is possible with a given crank radius.

What is claimed is:

1. An adjusting device, for vehicular door locks comprising:

a drive motor;

a crank which, in each adjusting action, may be driven by said drive motor at a swivelling angle of 180 degrees in the same direction of rotation;

a slide having a push rod and adjustable by said crank between two end positions;

said slide being coupled with said crank during part of its swivelling motion, but in said end positions being decoupled from said crank after a swivelling angle of 180 degrees, so that said slide is then smoothly adjustable between its end positions; and adjusting force checking means operable in each adjusting action for checking the adjusting force of said drive motor and interrupting the decoupling between said crank and said slide only when the adjusting force of said drive motor exceeds a minimal value which is at least as great as a predetermined maximally necessary adjusting force.

2. An adjusting device, for vehicular door locks comprising:

a drive motor;

a crank which, in each adjusting action, may be driven by said drive motor at a swivelling angle of 180 degrees in the same direction of rotation;

a slide having a push rod and adjustable by said crank between two end positions;

said slide being coupled with said crank during part of its swivelling motion, but in said end positions being decoupled from said crank after a swivelling angle of 180 degrees, so that said slide is then smoothly adjustable between its end positions; and adjusting force checking means operable in each adjusting action for checking the adjusting force of said drive motor and interrupting the decoupling between said crank and said slide only when the adjusting force of said drive motor exceeds a minimal value which is at least as great as a predetermined maximally necessary adjusting force;

wherein said adjusting force checking means includes:

a part which is continuously operatively connected with said drive motor, and a locking element for engaging said part, said locking element exerting a locking force on said part which has to be overcome in each adjusting action for an interruption of the decoupling between crank and slide;

said locking force being the maximally necessary adjusting force for said slide.

3. An adjusting device in accordance with claim 2, comprising:

a gearing member between said drive motor and said crank; and wherein said part comprises a stop in said gearing member, said stop cooperating with said locking element in at least one of said two end positions.

4. An adjusting device in accordance with claim 3, wherein:

said gearing member occupies different positions in said two end positions of said slide and said gearing member has a second stop which co-operates with said locking element in the other of said two end positions.

5. An adjusting device in accordance with claim 4, wherein:

said gearing member is a toothed wheel connected with said crank and said toothed wheel has two stops which are arranged diametrically opposite to each other.

6. An adjusting device in accordance with claim 3, wherein:

said gearing member occupies the same position in both end positions of the slide and wherein said gearing member includes only one stop.

7. An adjusting device in accordance with claim 6, comprising:

a second toothed wheel connected with said crank; and said gearing member is an intermediate wheel which drives said second toothed wheel.

8. An adjusting device in accordance with claim 2, wherein said locking element includes a locking bolt which is pressed into the path of motion of said stop by means of a helical compression spring.

* * * * *